(12) United States Patent
Liu

(10) Patent No.: US 9,852,704 B2
(45) Date of Patent: Dec. 26, 2017

(54) LIQUID CRYSTAL DISPLAY PANEL

(71) Applicant: SHENZHEN CHINA STAR OPTOELECTRONICS TECHNOLOGY CO., LTD., Shenzhen (CN)

(72) Inventor: Huan Liu, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/416,377

(22) PCT Filed: Oct. 21, 2014

(86) PCT No.: PCT/CN2014/089011
§ 371 (c)(1),
(2) Date: May 5, 2016

(87) PCT Pub. No.: WO2016/049951
PCT Pub. Date: Apr. 7, 2016

(65) Prior Publication Data
US 2017/0193934 A1    Jul. 6, 2017

(30) Foreign Application Priority Data

Sep. 29, 2014    (CN) .......................... 2014 1 0514024

(51) Int. Cl.
*G06F 3/038* (2013.01)
*G09G 5/00* (2006.01)
(Continued)

(52) U.S. Cl.
CPC ......... *G09G 3/3614* (2013.01); *G02F 1/1368* (2013.01); *G02F 1/136286* (2013.01);
(Continued)

(58) Field of Classification Search
CPC ............... G09G 3/3614; G09G 3/3648; G09G 2300/0426
See application file for complete search history.

(56) References Cited

U.S. PATENT DOCUMENTS 8,582,067 B2    11/2013  Wang et al.
9,035,915 B2     5/2015  Chung et al.
(Continued)

FOREIGN PATENT DOCUMENTS

CN    101303840 A    11/2008
CN    101714339 A  * 5/2010
(Continued)

OTHER PUBLICATIONS

International Search Report and Written Opinion (Forms PCT/ISA/237, PCT/ISA/220 and PCT/ISA/210) dated Jul. 6, 2015, by the State Intellectual Property Office of China in corresponding International Application No. PCT/CN2014/089011. (11 pages).

*Primary Examiner* — Nan-Ying Yang
(74) *Attorney, Agent, or Firm* — Buchanan Ingersoll & Rooney PC

(57) ABSTRACT

The present disclosure provides a liquid crystal display panel, comprising a plurality of pixels disposed in an array formed by a plurality of data lines and a plurality of scan lines in an orthogonal configuration, wherein the plurality of data lines comprise a first data line corresponding to each column of pixels; and at least one second data line corresponding to each column of pixels or corresponding to at least two adjacent columns of pixels in a group, said at least one second data line not being connected with any pixel in any column, and the sum of change of an input signal of said at least one second data line and that of a pixel driving signal of each column of pixels or of said at least two adjacent columns of pixels in a group being zero, so that a common electrode voltage would not deviate from a predetermined (Continued)

voltage. Therefore, according to the embodiments of the present disclosure, the phenomenon that the common electrode voltage would deviate due to the couple effect of the data lines can be greatly reduced, thus the horizontal crosstalk resulted from the coupled common electrode voltage can be reduced.

6 Claims, 5 Drawing Sheets

(51) Int. Cl.
    *G09G 3/36*     (2006.01)
    *G02F 1/1368*     (2006.01)
    *G02F 1/1362*     (2006.01)

(52) U.S. Cl.
    CPC ..... *G09G 3/3648* (2013.01); *G02F 2201/121* (2013.01); *G09G 2310/0243* (2013.01); *G09G 2320/0247* (2013.01)

(56) References Cited

U.S. PATENT DOCUMENTS

2010/0320472 A1* 12/2010 Liu .................. G02F 1/136259
    257/59
2013/0021548 A1     1/2013  Sung et al.

FOREIGN PATENT DOCUMENTS

| CN | 102156359 A | 8/2011 |
| CN | 102789342 A | 11/2012 |

* cited by examiner

LIQUID CRYSTAL DISPLAY PANEL

The present application claims benefit of Chinese patent application CN 201410514024.9, entitled "LIQUID CRYSTAL DISPLAY PANEL" and filed on Sep. 29, 2014, which is incorporated herein by reference.

TECHNICAL FIELD

The present disclosure relates to the technical field of liquid crystal display, and in particular, to a liquid crystal display panel.

TECHNICAL BACKGROUND

In the technical field of thin film transistor-liquid crystal display (TFT-LCD), in order to overcome a DC block effect of an alignment film and enable liquid crystals undergo a directional polarization, it is necessary to drive liquid crystals through polarity inversion. Among others, column inversion mode is usually utilized on large size panels for its power saving and better charge rate.

In the column inversion mode, sub-pixels corresponding to adjacent data lines undergo a positive-negative polarity inversion at column level. This mode results in a it phase shift between two adjacent columns of flicker waveforms, thus restraining flickers to a certain degree.

Figure 1:
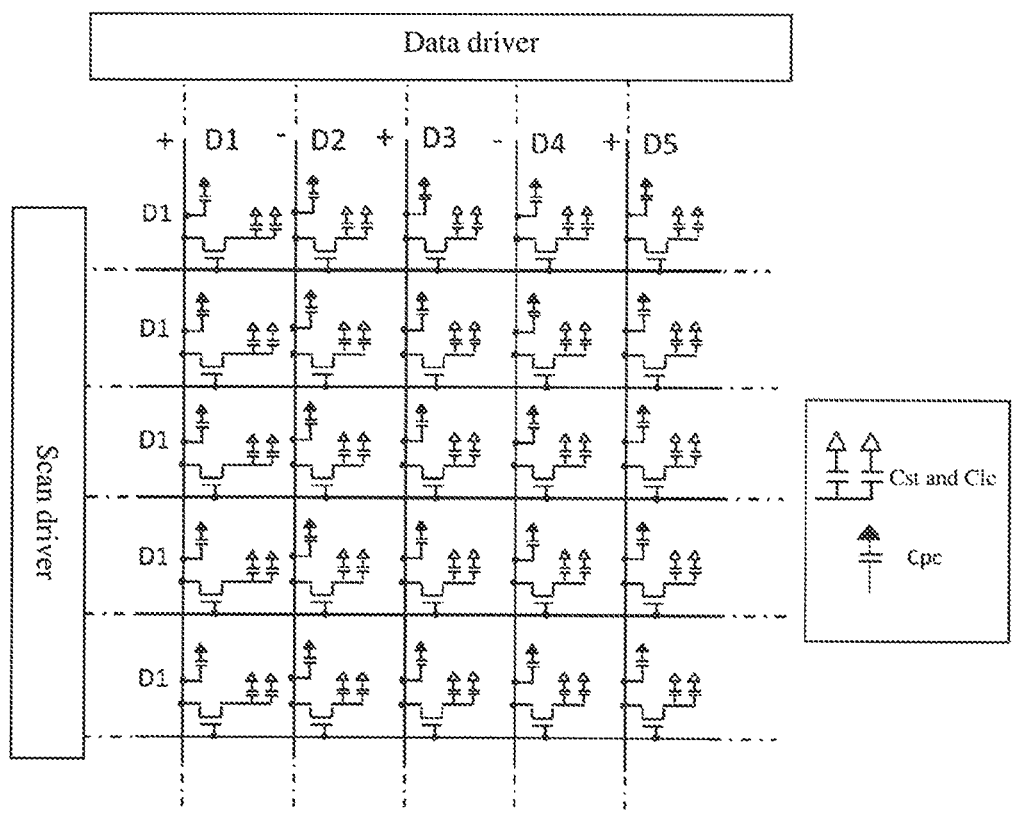

FIG. 1 schematically shows the structure of a current liquid crystal display panel, wherein a driving structure adopting the column inversion mode is shown. As shown in FIG. 1, when a scan signal is input, all the TFTs connected to the same scan line are activated, and a pixel driving signal in the data line is stored in a storage capacitor Cst and a liquid crystal capacitor Clc inside the pixel. Then, all the TFTs on the scan line are deactivated and all the TFTs on the next scan line are activated, and a voltage in the data line is changed into a data voltage required in this scan line.

However, there is a parasitic capacitance Cpc between the data line and an upper plate common electrode, as well as between the data line and a bottom plate common electrode, thus the change of waveform of a common electrode voltage Vcom will be affected under a capacitive coupling effect. Therefore, the waveform of the common electrode voltage Vcom will deviate from a predetermined DC waveform (see FIG. 2(c)). When a pixel signal is stored in the pixel electrode through the data line, if the common electrode voltage Vcom deviates from the predetermined waveform for being affected by the capacitive coupling effect of the data lines, the voltage difference of both ends of the liquid crystal of the pixel on the scan line deviates from a predetermined voltage difference at this time, so that the pixel cannot display at a predetermined grayscale, thus resulting in a phenomenon of horizontal crosstalk (see FIG. 3).

Some current display panels adopt a 1G2D framework for a low color shift design, wherein a primary area and a subarea of the pixel are charged through two data lines with opposite polarities respectively. Although the coupling effect of the data line on the common electrode can be reduced to a certain degree with the low color shift design, the design has to meet some special requirements, and also suffers the effect of a feed through voltage, which also results in the coupling effect of the data line on the common electrode to a certain degree and thus causes deviation of the common electrode voltage Vcom. Therefore, the horizontal crosstalk would still exist in the 1G2D framework due to the coupled common electrode.

SUMMARY OF THE INVENTION

One of the technical problems to be solved by the present disclosure is to provide a liquid crystal display panel that can overcome the phenomenon of horizontal crosstalk.

In order to solve the above-mentioned technical problem, an embodiment of the present disclosure firstly provides a liquid crystal display panel, comprising a plurality of pixels disposed in an array formed by a plurality of data lines and a plurality of scan lines in an orthogonal configuration. The plurality of data lines comprise: a first data line corresponding to each column of pixels, the first data line being connected with each of the pixels in the column so that a pixel driving signal can be input into the pixels in said column through the first data line; and at least one second data line corresponding to each column of pixels or corresponding to at least two adjacent columns of pixels in a group, said at least one second data line not being connected with any pixel in any column, and the sum of change of an input signal of said at least one second data line and that of a pixel driving signal of each column of pixels or of said at least two adjacent columns of pixels in the group being zero, so that a common electrode voltage will not deviate from a predetermined voltage.

Preferably, when only one second data line is provided for each column of pixels, the input signal of said one second data line has the same amplitude but an opposite polarity as the pixel driving signal of the respective column of pixels.

Preferably, all the second data lines are arranged on the same side with respect to each column of pixels.

Preferably, when a plurality of second data lines are provided for each column of pixels, the input signal of said plurality of second data lines has the same amplitude but an opposite polarity as the pixel driving signal of the respective column of pixels.

Preferably, the plurality of second data lines are arranged on the same side with respect to each column of pixels. Alternatively, when an even number of second data lines are provided for each column of pixels, said even number of second data lines are symmetrically arranged on both ends of each column of pixels.

Preferably, when only one second data line is provided for at least two adjacent columns of pixels in each group, the input signal of said one second data line has the same amplitude but an opposite polarity as the pixel driving signal of said at least two adjacent columns of pixels of the respective group.

Preferably, all the second data lines are arranged on the same side of said at least two adjacent columns of pixels in the respective group.

Preferably, when a plurality of second data lines are provided for at least two adjacent columns of pixels in each group, the input signals of said plurality of second data lines each have the same amplitude but an opposite polarity as the pixel driving signal of said at least two adjacent columns of pixels of the respective group.

Preferably, the plurality of second data lines are arranged on the same side with respect to each column of pixels. Alternatively, when an even number of second data lines are provided for at least two adjacent columns of pixels in each group, said even number of second data lines are symmetrically arranged on both ends of said at least two adjacent columns of pixels of the respective group.

Preferably, the liquid crystal display panel can be driven through column inversion mode, line inversion mode, frame inversion mode, or dot inversion mode.

Another embodiment of the present disclosure further provides a liquid crystal display, comprising the above-mentioned liquid crystal display panel.

Compared with the prior art, one or more embodiments in the above-mentioned solutions have following advantages or beneficial effects.

The embodiment of the present disclosure provides a liquid crystal display panel, wherein at least one data line is added corresponding to each column of pixels or at least two adjacent columns of pixels in a group, so that the sum of change of an input signal of said at least one data line and that of a pixel driving signal of each column of pixels or of said at least two adjacent columns of pixels in a group is zero. Therefore, the phenomenon that the common electrode voltage would deviate due to the couple effect of the data lines can be greatly reduced, thus the horizontal crosstalk resulted from the coupled common electrode voltage can be reduced.

Other features and advantages of the present disclosure will be further explained in the following description, and are partially become more readily evident therefrom, or be understood through implementing the technical solutions according to the present disclosure. The objectives and advantages of the present disclosure will be achieved through the structure and/or the process specifically pointed out in the description, claims, and the accompanying drawings.

BRIEF DESCRIPTION OF THE ACCOMPANYING DRAWINGS

The accompanying drawings are provided to further understand the solutions of the present disclosure or the prior art, and constitute part of the description, wherein the examples of the present disclosure and the accompanying drawings showing the examples of the present disclosure are intended to illustrate, rather than restrict the technical solutions of the present disclosure.

FIG. 1 schematically shows the structure of a current liquid crystal display panel.

Figure 2:
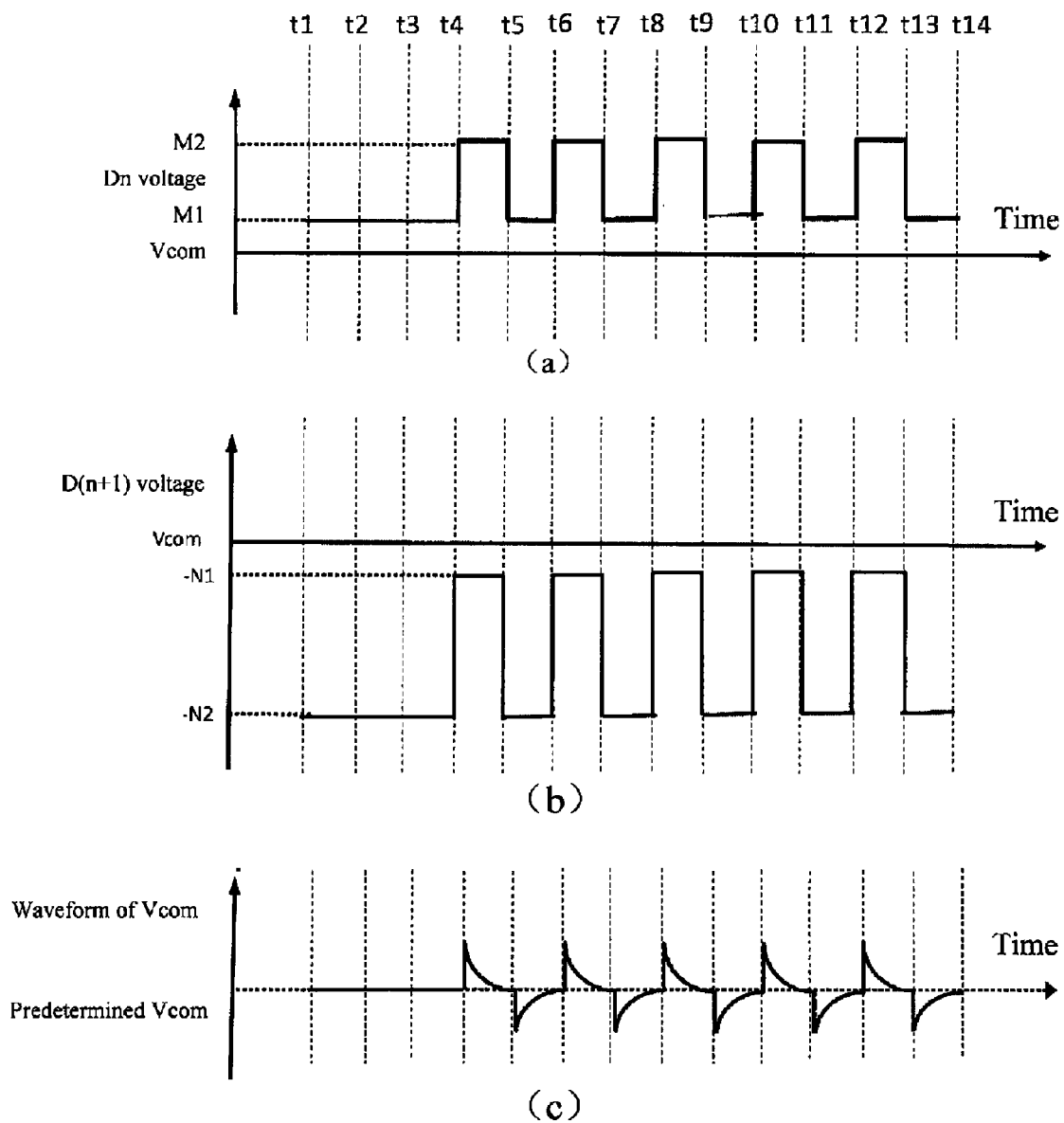

FIGS. 2($a$), 2($b$), and 2($c$) schematically show a voltage waveform of a data line Dn, a voltage waveform of a data line D(n+1), and a waveform of a deviated common electrode voltage Vcom resulted from the coupling effect, respectively.

Figure 3:
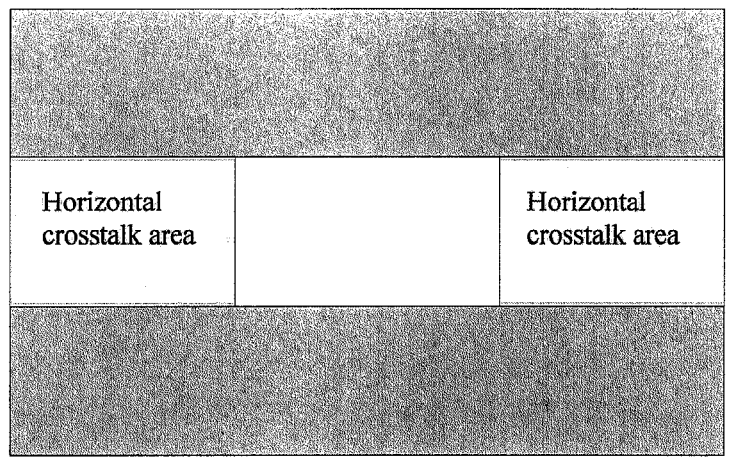

FIG. 3 schematically shows a horizontal crosstalk of a liquid crystal display panel in the prior art.

Figure 4:
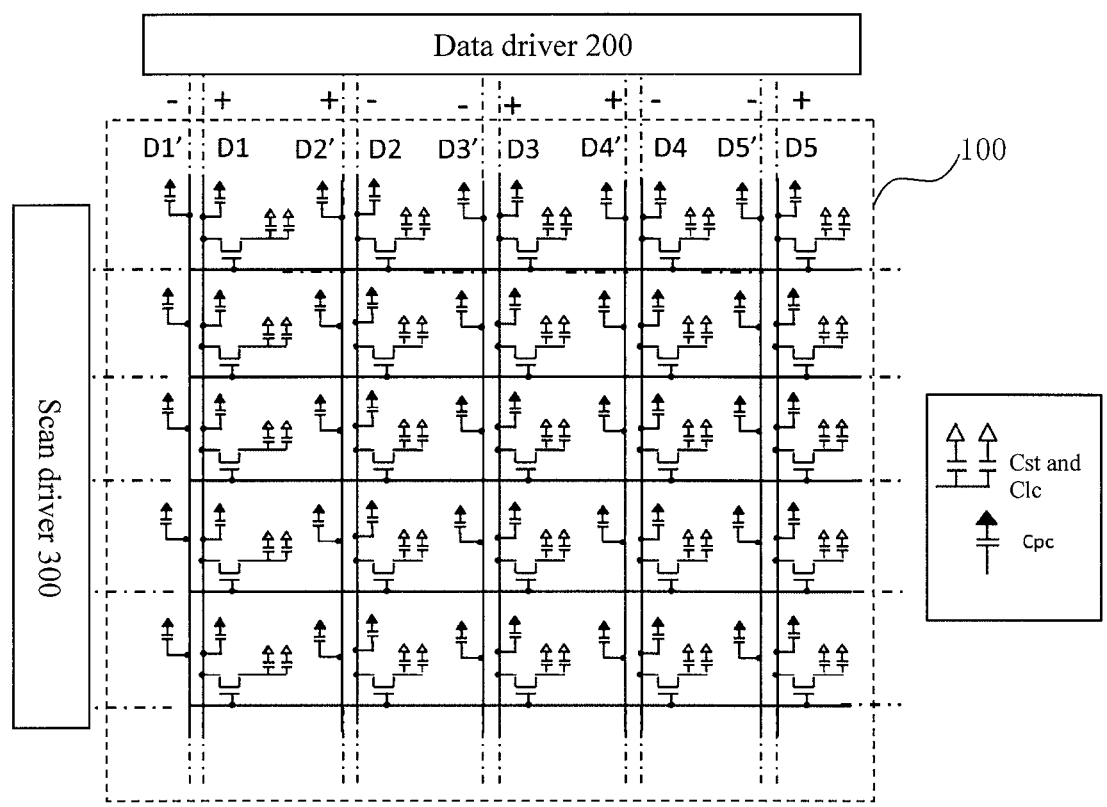

FIG. 4 schematically shows the structure of a liquid crystal display panel according to an embodiment of the present disclosure.

Figure 5:
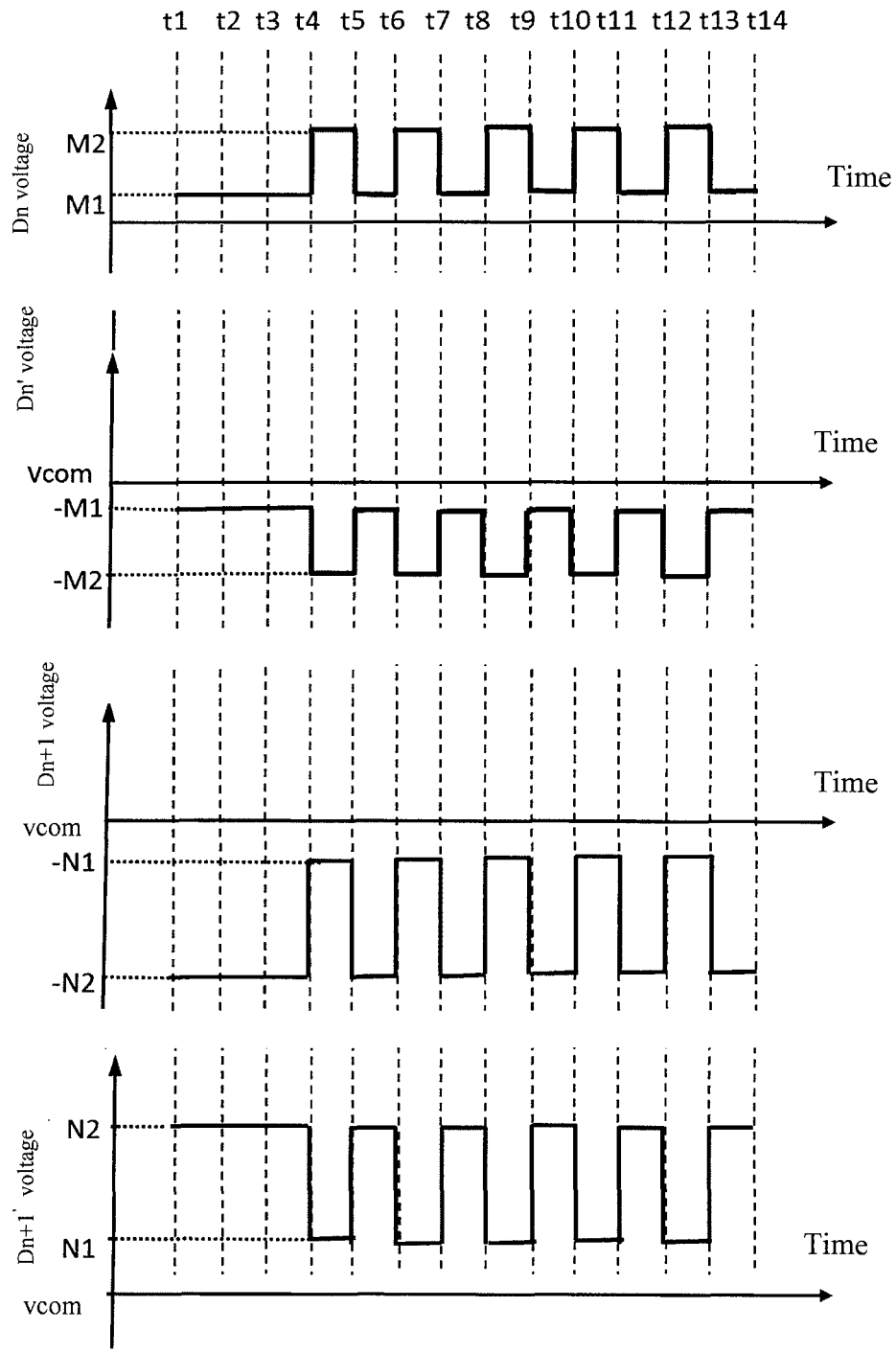

FIG. 5 schematically shows waveforms of the data line voltage and common electrode voltage applied to the liquid crystal display panel in FIG. 4 under a reload picture.

Figure 6:
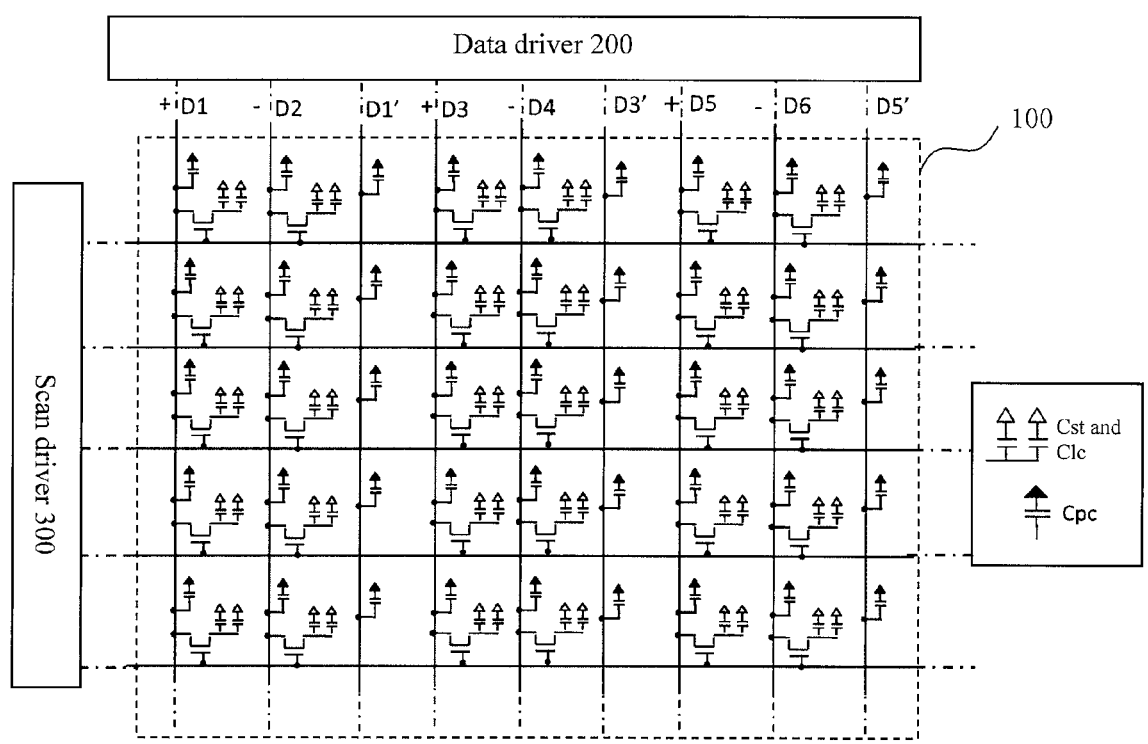

FIG. 6 schematically shows the structure of a liquid crystal display panel according to another embodiment of the present disclosure.

DETAILED DESCRIPTION OF THE EMBODIMENTS

The present disclosure will be explained in detail with reference to the embodiments and the accompanying drawings, whereby it can be fully understood about how to solve the technical problem by the technical means according to the present disclosure and achieve the technical effects thereof, and thus the technical solution according to the present disclosure can be implemented. It is important to note that as long as there is no structural conflict, various embodiments as well as the respective technical features mentioned herein may be combined with one another in any manner, and the technical solutions obtained all fall within the scope of the present disclosure.

In order to solve the technical problem of horizontal crosstalk generated when the liquid crystal display panel displays images, an embodiment of the present disclosure provides a liquid crystal display panel, wherein at least one data line is added corresponding to each column of pixels or at least two adjacent columns of pixels in a group, so that the sum of change of an input signal of said at least one data line and that of a pixel driving signal of each column of pixels or of said at least two adjacent columns of pixels in a group is zero. Therefore the phenomenon that the common electrode voltage would deviate due to the couple effect of the data lines can be greatly reduced, thus the horizontal crosstalk resulted from the coupled common electrode voltage can be reduced.

Embodiment 1

FIG. 4 schematically shows the structure of a liquid crystal display panel according to an embodiment of the present disclosure. As shown in FIG. 4, the display panel comprises an image display area 100, a data driver 200 and a scan driver 300. The image display area 100 comprises an array (also known as a pixel area) formed by a plurality of data lines (the data lines D1 and D1' as shown in the figure) and a plurality of scan lines in an orthogonal configuration, and a plurality of pixels disposed in the array. The data driver 200 transmits a pixel driving signal provided to the image display area 100 through the plurality of data lines coupled thereto. The scan driver 300 transmits a scan signal provided to the image display area 100 through the plurality of scan lines coupled thereto.

In the following, the driving structure of the liquid crystal display panel according to the embodiment of the present disclosure will be explained in detail. As shown in FIG. 4, two data lines are arranged corresponding to each column of pixels, which are named as a first data line and a second data line for illustration purposes. The first data line is connected with each of the pixels in the column so that the pixel driving signal can be input into the pixels in said column through the first data line, and the second data line is not connected with any pixel in this column, the input signal of the second data line having the same amplitude but an opposite polarity as the pixel driving signal input from the first data line. Preferably, the second data lines are all arranged on the same side with respect to each column of pixels. As shown in FIG. 4, all of the second data lines D1', D2', D3' and the like are arranged on the left side adjacent to the first data lines D1, D2, D3 and the like. This arrangement can reduce the complexity of the manufacture of the display panel, homogenizing the layout of the display panel, and enhance the yield of production.

Take the first column of pixels as an example. The first data line D1 and the second data line D1' are arranged corresponding to the column of pixels. As shown in FIG. 4, the data line D1 is connected to a storage capacitor Cst and a liquid crystal capacitor Clc of each pixel of the column through respective TFTs. The data line D1' is independent of the data line D1, and not connected with any pixel. The data line D1 and the data line D1' each form a parasitic capacitance Cpc with an upper plate common electrode and a bottom plate common electrode respectively when transmitting signals, and the changes of the data lines D1 and D1' both have a coupling effect on the common electrode voltage.

However, compared with a common liquid crystal display panel in the prior art, in the embodiment of the present disclosure, a data line is added to each column of pixels, i.e., each column of pixels corresponds to two data lines Dn (the data line Dn is connected with this column of pixels and charge the pixels therethrough) and Dn' (the data line Dn' is not connected with any pixel), and the voltage input from the data line Dn' has the same amplitude but an opposite polarity as the voltage of the data line Dn. This enables the change of voltage of the data line Dn' have a same amplitude but an opposite polarity as that of the data line Dn at any time, so that the sum of the changes of voltages of both data lines is zero. Therefore, the phenomenon that the common electrode voltage would deviate due to coupling effect of the data lines can be greatly reduced, thus the horizontal crosstalk resulted from the coupled common electrode voltage can be reduced. In other words, although the data lines D1 and D1' each have a parasitic capacitance Cpc with the upper plate common electrode and the bottom plate common electrode, the coupling effects caused by the two parasitic capacitances have an same amplitude but the opposite direction, and thus will be neutralized with each other. Therefore, the common electrode voltage will not deviate from the predetermined voltage.

The display effect of the common liquid crystal display panel and that of the liquid crystal display panel according to the embodiment of the present disclosure will be explained by contrast, taking the voltage written into the data line of pixels shown in FIG. 2 as an example.

(1) For the common liquid crystal display panel, horizontal crosstalk will occur in the image displayed thereon.

The horizontal crosstalk resulted from the common electrode voltage Vcom affected by the coupling effect of the data lines will be explained with the horizontal crosstalk in a common reload picture as an example. The background of the picture is a low grayscale picture, and the middle window is a reload picture of the liquid crystal display panel. Under the same frame of the reload picture, the positive polarity voltage waveforms are the same, so are the negative polarity ones.

In a certain frame, the waveforms of two adjacent data lines Dn and D(n+1) are shown in FIG. 2(a) and FIG. 2(b) respectively. A voltage of the data line Dn (hereinafter referred as Dn voltage) in this frame is positive polarity, and a voltage of the data line D(n+1) (hereinafter referred as D(n+1) voltage) in the frame is negative polarity.

From time t1 to time t4, the Dn voltage keeps as M1, and the D(n+1) voltage keeps as −N2, the Vcom voltage being constant.

At time t4, the Dn voltage rises from M1 to M2 suddenly, and the D(n+1) voltage rises from −N2 to −N1 suddenly. Since the Dn voltage and D(n+1) voltage both rise at the same time, there is a parasitic capacitance generated between the data line and the common electrode (see FIG. 1). Therefore, the common electrode voltage Vcom is also raised because of the coupling effect of the capacitance Cpc, as shown in FIG. 2(c).

Similarly, at time t5, the Dn voltage reduces from M2 to M1 suddenly, and the D(n+1) voltage reduces from −N1 to −N2 suddenly. Since the Dn voltage and D(n+1) voltage both reduce at the same time, the common electrode voltage Vcom is reduced, as shown in FIG. 2(c).

Under the reload picture, all the waveforms of positive polarity voltage are similar to that of the data line Dn, and all the waveforms of negative polarity voltage are similar to that of the data line D(n+1). Therefore, the changes of voltages of all the data lines will render the common electrode voltage Vcom raised or reduced, so that the common electrode voltage Vcom in the display panel will deviate, leading to the horizontal crosstalk.

It needs to be noted that although the reload pictured is explained as an example, the pictures that may suffer the horizontal crosstalk are not restricted to this. Actually, when the change of voltage of the data line in some region at any time is not zero, the common electrode voltage in this region will deviate due to the coupling effect of the data line.

(2) The liquid crystal display panel according to the embodiment of the present disclosure can reduce the horizontal crosstalk effectively.

Take two adjacent data lines Dn and D(n+1) connected with the pixels as an example. As shown in FIG. 5, at time t4, the Dn voltage rises from M1 to M2 suddenly, while the voltage of the data line Dn' (hereinafter referred as Dn' voltage) reduces from −M1 to −M2 at the same time. The change of Dn' voltage has the same amplitude but an opposite polarity as that of Dn voltage, so that the coupling effect of the data line Dn on the common electrode Vcom will be neutralized.

Similarly, at time t4, the D(n+1) voltage raises from −N2 to −N1, while the voltage of D(n+1)' (hereinafter referred as D(n+1)' voltage) reduces from N2 to N1. Thus the change of D(n+1)' voltage neutralizes the coupling effect of the D(n+1) voltage change on the common electrode voltage Vcom.

Similarly, at time t5, the Dn voltage reduces from M2 to M1 suddenly, and the D(n+1) voltage reduces from −N1 to −N2 suddenly. The change of the Dn' voltage has the same amplitude but an opposite polarity as that of the Dn voltage, and the change of the D(n+1)' voltage has the same amplitude but an opposite polarity as that of the D(n+1) voltage, thus the sum of the changes of voltages of the data lines is zero.

As known from FIG. 5, according to the liquid crystal display panel in the embodiment of the present disclosure, the sum of voltages of two data lines corresponding to each column of pixels is zero, and the sum of changes of the voltages is also zero. It can be further understood that under any display picture, since the changes of voltages of two data lines corresponding to each column of pixels always have the same amplitude but opposite polarities so that their sum is zero, the coupling effect of the data lines on the common electrode under any picture will be reduced, and thus the horizontal crosstalk caused by the coupled common electrode voltage will be reduced.

However, it should be understood that the embodiments are not restricting the present disclosure. For example, a plurality of second data lines can be arranged corresponding to each column of pixels. The input signals of the plurality of second data lines each have the same amplitude but an opposite polarity as the pixel driving signal of the column of pixels. In this manner, the technical effect of the present disclosure can be achieved, thus reducing the horizontal crosstalk effectively. Moreover, the plurality of second data lines are preferably arranged on the same side with respect to each column of pixels. Alternatively, when an even number of second data lines are provided for each column of pixels, said even number of second data lines are preferably symmetrically arranged on both ends of each column of pixels. This arrangement can reduce the complexity of the manufacture of the display panel, homogenize the layout of the display panel, and enhance the yield of production.

In addition, the liquid crystal display panel of the embodiment of the present applicant can be driven through not only column inversion mode, but also line inversion mode, frame inversion mode or dot inversion mode.

In conclusion, the embodiment of the present disclosure provides a liquid crystal display panel, wherein at least one data line is added corresponding to each column of pixels, so that the sum of change of an input signal of said at least one data line and that of a pixel driving signal of each column of pixels is zero. Therefore, the phenomenon that the common electrode voltage would deviate due to the couple effect of the data lines can be greatly reduced, thus the horizontal crosstalk resulted from the coupled common electrode voltage can be reduced.

Embodiment 2

FIG. 6 schematically shows the structure of a liquid crystal display panel according to another embodiment of the present disclosure. The structure of each component of the display panel will be explained in detail with reference to FIG. 6.

As shown in FIG. 6, the display panel comprises an image display area 100, a data driver 200 and a scan driver 300. The image display area 100 comprises an array (also known as a pixel area) formed by a plurality of data lines (the data lines D1 and D1' as shown in the figure) and a plurality of scan lines in an orthogonal configuration, and a plurality of pixels disposed in the array. The data driver 200 transmits a pixel driving signal provided to the image display area 100 through the plurality of data lines coupled thereto. The scan driver 300 transmits a scan signal provided to the image display area 100 through the plurality of scan lines coupled thereto.

In the following, the driving structure of the liquid crystal display panel according to the embodiment of the present disclosure will be explained in detail.

Unlike the former embodiment, in the present embodiment, a second data line is arranged corresponding to every two adjacent columns of pixels that form a group. The second data line is not connected with any pixel of the two columns, and the input signal of the second data line has the same amplitude but an opposite polarity as the pixel driving signal of the two adjacent columns of pixels in the group. Preferably, the second data lines are all arranged at the same side with respect to said at least two adjacent columns of pixels in each group. As shown in FIG. 6, all of the second data lines D1', D3', D5' and the like are arranged at the right side with respect to an adjacent first data lines in each group. This arrangement can reduce the complexity of the manufacture of the display panel, homogenizing the layout of the display panel, and enhance the yield of production.

As shown in FIG. 6, according to the embodiment of the present disclosure, on the basis of the driving structure of the current liquid crystal display panel, a data line is added corresponding to every two adjacent columns of pixels, i.e., two columns of pixels corresponds to three data lines. Take the adjacent, first and second columns of pixels as an example, a data line D1' is added in addition to the data lines D1 and D2 connected with the two columns of pixels respectively.

The corresponding columns of pixels are charged through the data lines D1 and D2, so that the first column of pixels is charged to a predetermined voltage A, and the second column of pixels is charged to a predetermined voltage B. Another data line D1' is not connected with any pixel, and its input voltage is −(A+B), i.e., the voltage of the data line D1' has the same amplitude but an opposite polarity as the sum of voltages of the data lines D1 and D2. In this way, at any time, the sum of voltages of the three data lines D1, D2, and D1' corresponding to the first and second columns of pixels is always zero, and the sum of changes of voltages is also zero.

It is to be understood that under any display picture, the changes of voltages of the three data lines corresponding to every two columns of pixels always have the same amplitude but opposite polarities, and thus the sum thereof is zero, so that the coupling effect of the data lines on the common electrode voltage under any picture will be greatly weakened, and the horizontal crosstalk caused by the coupled common electrode voltage will be reduced.

However, it should be understood that the embodiments are not restricting the present disclosure. For example, one or more second data lines can be arranged corresponding to a plurality of adjacent columns (for example, three or four columns) of pixels that form a group. The input signals of the corresponding one or more second data lines each have the same amplitude but an opposite polarity as the pixel driving signals of the plurality of columns of pixels in this group. In this manner, the technical effect of the present disclosure can be achieved, thus reducing the horizontal crosstalk effectively. Moreover, the plurality of second data lines are preferably arranged on the same side with respect to at least two adjacent columns of pixels in a group. Alternatively, when an even number of second data lines are provided for at least two adjacent columns of pixels in a group, said even number of second data lines are preferably symmetrically arranged on both ends of at least two adjacent columns of pixels in a group. This arrangement can reduce the complexity of the manufacture of the display panel, homogenizing the layout of the display panel, and enhance the yield of production.

In addition, the liquid crystal display panel of the embodiment of the present disclosure can be driven through not only column inversion mode, but also line inversion mode, frame inversion mode or dot inversion mode.

In conclusion, the embodiment of the present disclosure provides a liquid crystal display panel, wherein at least one data line is added corresponding to at least two adjacent columns of pixels in a group, so that the sum of change of an input signal of said at least one data line and that of a pixel driving signal of at least two adjacent columns of pixels in a group is zero. Therefore, the phenomenon that the common electrode voltage would deviate due to the couple effect of the data lines can be greatly reduced, thus the horizontal crosstalk resulted from the coupled common electrode voltage can be reduced.

In addition, the present disclosure further provides a liquid crystal display, comprising the liquid crystal display panel according to the first embodiment or the second embodiment.

The above description should not be construed as limitations of the present disclosure, but merely as exemplifications of embodiments thereof. Any variations or replacements that can be readily envisioned by those skilled in the art are intended to be within the scope of the present disclosure.

The invention claimed is:

1. A liquid crystal display panel, comprising:
   a plurality of pixels disposed in an array formed by a plurality of data lines and a plurality of scan lines in an orthogonal configuration, wherein the plurality of data lines comprise:

a first data line corresponding to each column of pixels, the first data line being connected with each of the pixels in the column so that a pixel driving signal can be input into the pixels in said column through the first date line; and at least one second data line corresponding to at least two adjacent columns of pixels in a group, said at least one second data line not being connected with any pixel in any column, and the sum of change of an input signal of said at least one second data line and that of a pixel driving signal of said at least two adjacent columns of pixels in the group being zero, so that a common electrode voltage will not deviate from a predetermined voltage, wherein only one second data line is provided for at least two adjacent columns of pixels in each group, and the input signal of said one second data line has the same amplitude but an opposite polarity as the pixel driving signal of said at least two adjacent columns of pixels of the respective group.

2. The liquid crystal display panel according to claim 1, wherein all the second data lines are arranged on the same side of said at least two adjacent columns of pixels in the respective group.

3. A liquid crystal display panel, comprising:

a plurality of pixels disposed in an array formed by a plurality of data lines and a plurality of scan lines in an orthogonal configuration, wherein the plurality of data lines comprise:

a first data line corresponding to each column of pixels, the first data line being connected with each of the pixels in the column so that a pixel driving signal can be input into the pixels in said column through the first date line; and at least one second data line corresponding to at least two adjacent columns of pixels in a group, said at least one second data line not being connected with any pixel in any column, and the sum of change of an input signal of said at least one second data line and that of a pixel driving signal of said at least two adjacent columns of pixels in the group being zero, so that a common electrode voltage will not deviate from a predetermined, wherein a plurality of second data lines are provided for at least two adjacent columns of pixels in each group, and the input signals of said plurality of second data lines each have the same amplitude but an opposite polarity as the pixel driving signal of said at least two adjacent columns of pixels of the respective group.

4. The liquid crystal display panel according to claim 3, wherein the plurality of second data lines are arranged on the same side with respect to each column of pixels, or an even number of second data lines are provided for at least two adjacent columns of pixels in each group, and said even number of second data lines are symmetrically arranged on both ends of said at least two adjacent columns of pixels of the respective group.

5. The liquid crystal display panel according to claim 3, wherein the liquid crystal display panel can be driven through column inversion mode, line inversion mode, frame inversion mode, or dot inversion mode.

6. The liquid crystal display panel according to claim 1, wherein the liquid crystal display panel can be driven through column inversion mode, line inversion mode, frame inversion mode, or dot inversion mode.

* * * * *